(12) United States Patent
Sandstrom et al.

(10) Patent No.: US 6,538,737 B2
(45) Date of Patent: *Mar. 25, 2003

(54) HIGH RESOLUTION ETALON-GRATING SPECTROMETER

(75) Inventors: Richard L. Sandstrom, Encinitas, CA (US); Alexander I. Ershov, San Diego, CA (US); William N. Partlo, Poway, CA (US); Igor V. Fomenkov, San Diego, CA (US); Daniel J. W. Brown, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/003,513

(22) Filed: Oct. 31, 2001

(65) Prior Publication Data

US 2002/0101589 A1 Aug. 1, 2002

Related U.S. Application Data

(63) Continuation-in-part of application No. 09/772,293, filed on Jan. 29, 2001.

(51) Int. Cl.[7] ................ G01J 3/14; G01J 3/18
(52) U.S. Cl. ............... 356/333; 356/334; 356/332
(58) Field of Search ................ 356/333, 331, 356/332, 334, 305, 308, 328

(56) References Cited

U.S. PATENT DOCUMENTS

| | | | | |
|---|---|---|---|---|
| 4,076,422 A | * | 2/1978 | Kohnno | 356/106 |
| 4,684,253 A | * | 8/1987 | Lindblom et al. | 356/333 |
| 5,285,255 A | * | 2/1994 | Baranne et al. | 356/328 |
| 5,450,207 A | * | 9/1995 | Fomenkov | 356/416 |
| 5,835,210 A | * | 11/1998 | Ershov | 356/328 |
| 5,859,702 A | * | 1/1999 | Lindblom | 356/305 |
| 6,061,129 A | * | 5/2000 | Ershov et al. | 356/328 |
| 6,137,821 A | * | 10/2000 | Ershov | 372/108 |
| 6,151,112 A | * | 11/2000 | Atkinson et al. | 356/328 |
| 6,240,110 B1 | * | 5/2001 | Ershov | 372/20 |
| 6,359,693 B2 | * | 3/2002 | Smith et al. | 356/519 |

* cited by examiner

Primary Examiner—Frank G. Font
Assistant Examiner—Layla Lauchman
(74) Attorney, Agent, or Firm—John R. Ross

(57) ABSTRACT

A high resolution etalon-grating spectrometer. A preferred embodiment presents an extremely narrow slit function in the ultraviolet range and is very useful for measuring bandwidth of narrow band excimer lasers used for integrated circuit lithography. Light from the laser is focused into a diffuser and the diffused light exiting the diffuser illuminates an etalon. A portion of its light exiting the etalon is collected and directed into a slit positioned at a fringe pattern of the etalon. Light passing through the slit is collimated and the collimated light illuminates a grating positioned in an approximately Littrow configuration which disburses the light according to wavelength. A portion of the dispursed light representing the wavelength corresponding to the selected etalon fringe is passed through a second slit and monitored by a light detector. When the etalon and the grating are tuned to the same precise wavelength a slit function is defined which is extremely narrow such as about 0.034 pm (FWHM) and about 0.091 pm (95 percent integral). The etalon and the grating are placed in a leak-fight enclosure filled with a gas, such as nitrogen or helium. The wavelength scanning of the spectrometer is done by changing the gas pressure in the enclosure during the scan.

8 Claims, 4 Drawing Sheets

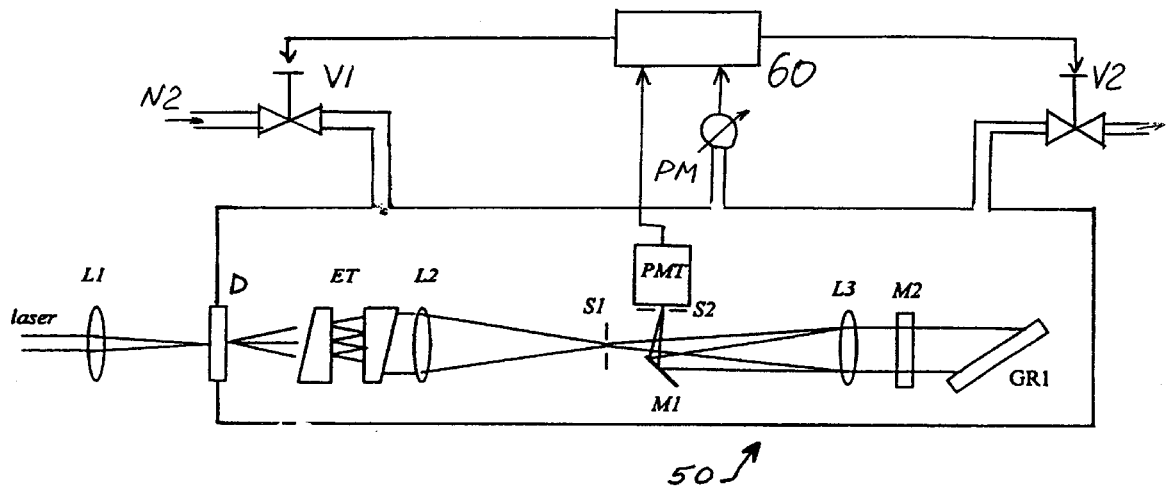
FIG. 2
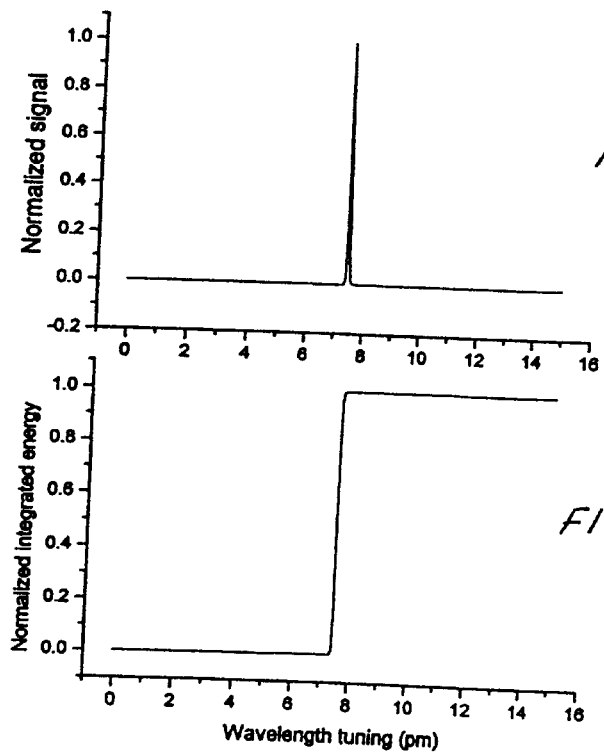
FIG. 3A
FIG. 3B

HIGH RESOLUTION ETALON-GRATING SPECTROMETER

This application is a continuation-in-part of U.S. Ser. No. 09/772,293, filed Jan. 29, 2001 which is incorporated herein by reference. The present invention relates to spectral monitoring instruments and in particular to instruments for monitoring wavelengths of narrow band ultraviolet lasers.

BACKGROUND OF THE INVENTION

Spectrometers

Spectrometers are well known devices for measuring the intensity of light at various wavelengths. A typical spectrometer consists of a slit, a collimator lens, a dispersive optic, such as a prism or grating, an objective lens or lenses for focussing the various wavelengths and a photometer for measuring the intensity of the various wavelengths. FIG. 1A is a schematic drawing of such a prior art grating-based spectrometer. A light source 2 which is the subject of a wavelength measurement is sampled by an optical fiber 4 having an internal diameter of about 250 microns and a portion of the light is directed to slit 6 which is longer than the internal diameter of the fiber and has a width of about 5 microns. Light passing through slit 6 expands in the 5 micron direction in a beam 7 at an angle of about 3 degrees. The beam is reflected from mirror 8 and is collimated by lens 10 for illumination of grating 12 which in this prior art representation is arranged in a Littrow configuration. Light at various wavelengths reflecting from the grating is dispersed at angles dependant on the wavelengths. A beam representing only one wavelength is depicted in FIG. 1 as reflecting from the grating 12 back through lens 10 and reflecting off mirrors 8 and 14 and is focused to a line at 15. (The long dimension of the line is into and out of the page.) This particular wavelength is refocused at a line 17 by objective lens 16. Light at this wavelength is measured by a photometer 18, while light at other wavelengths is blocked by a slit 19 placed in front of the photometer 18. Slit 19 and photometer 18 are placed in the same housing. Light at wavelengths other than the depicted wavelength is reflected off grating 12 at angles slightly different from that of the depicted beam. Thus, other wavelengths are measured at positions above or below line 17 by photometer 18 which, as indicated in FIG. 1, moves back and forth, together with slit 19, to make these intensity measurements.

The resolution of this prior art spectrometer is limited by dispersion of the grating and its size. Both of these parameters can only be improved up to a certain level determined by technology limits and cost. If desired parameters still cannot be achieved, then several diffraction gratings can be used in more elaborate spectrometry. This will proportionally increase the resolution. However, these more elaborate techniques can substantially increase the cost and the size of the spectrometer. What is needed is a simple and inexpensive method of substantially increasing the precision of prior art spectrometers. A particular need exists for a compact, high resolution ultraviolet spectrometer with a resolution of the order of 0.05 pm. Such a spectrometer is needed to monitor the output spectrum of narrow band excimer lasers used, for example, in micro lithography.

It is well known that a Fabry-Perot etalon may also be used as the dispersive element rather than a diffraction grating. Etalons are routinely capable of producing resolving powers on the order of $10^7$. Because etalons do not require the use of a slit aperture, their luminosity is high. Unfortunately, to achieve high resolving powers with an etalon spectrometer one would traditionally have to sacrifice free spectral range.

The transmission of an etalon when illuminated by a diffuse monochromatic source is maximized at specific angles. These fringes of equal inclination produce a concentric ring pattern when imaged by a lens. The angular separation between consecutive fringes of an etalon defines the FSR of the etalon in angle space. The relationship between the maximum angle $\theta$, of an etalon with respect to wavelength is defined by:

$$m\lambda = 2nd \cos(\theta) \qquad (1)$$

where:
m=fringe order
n=index of refraction
d=plate separation of etalon

These multiple fringes or pass bands in the transmission of a single etalon limit its usefulness to a region between consecutive fringes. In a typical etalon spectrometer, the usable spectral range is limited to about 30 to 40 times its resolution. However, in order to measure the spectrum of an excimer laser used for microlithography a much larger spectral range is required.

Narrow Band Excimer Lasers

Line narrowed excimer lasers are currently used as the light source for microlithography. In order to provide integrated circuit feature sizes in the range of a small fraction of a micron, the bandwidth of the laser beam must be narrowed to a fraction of a picometer and the central wavelength must be controllable to an accuracy of a small fraction of a picometer. FIG. 1B is a drawing of a narrow band excimer laser system 1 showing a typical scheme for controlling the wavelength and bandwidth of these excimer lasers. A gain medium is created in laser chamber 22 by electric discharges between two elongated electrodes 24 (only the top electrode is shown). At the rear of the chamber, the laser beam exits into a line narrowing package, LNP, 26 which comprises a three prism beam expander 28, a tuning mirror 30 and a grating 32 arranged in a Littrow configuration. Tuning mirror 30 is arranged to pivot about an axis as indicated in the figure and its position is controlled by a precision driver unit 34 such as a stepper motor or a piezoelectric driver or a combination of the two for wide tuning range and precise control. Precise control is provided in a feedback arrangement in which a portion of the output beam downstream of output coupler 36 is sampled by very fast response wavemeter 38 which measures the central wavelength and bandwidth and controls the central bandwidth to a target value by appropriate feedback signals to driver unit 34.

In order to characterize the spectral properties of microlithography excimer lasers, two specifications are commonly used. The first one is the full width at half maximum ($\Delta\lambda_{FWHM}$), and the second one defines the range containing 95% of the total laser pulse energy. This specification is commonly referred to as $\Delta\lambda_{95\%}$ and it defines the amount of energy which is contained in the spectrum tails. In the typical microlithography excimer laser, $\Delta\lambda_{95\%}$ is about three times larger than $\Delta\lambda_{FWHM}$. In order to accurately measure both $\Delta\lambda_{FWHM}$ and $\Delta\lambda_{95\%}$ a spectrometer with resolution of about 0.05 pm and usable spectrum scan range of at least 5 pm is required. These two parameters are extremely difficult to achieve simultaneously using prior art spectrometers. The etalon spectrometer even though capable of providing 0.05 pm resolution will have a usable scanning range limited to 1–2 pm at this resolution. On the other hand, grating spectrometer, having resolution of 0.05 pm at 193 nm is extremely bulky and very expensive device.

What is needed is a comparably inexpensive device which would provide simultaneously resolution of 0.05 pm and scanning range of 5 pm.

SUMMARY OF THE INVENTION

The present invention provides a high resolution etalon-grating spectrometer. A preferred embodiment presents an extremely narrow slit function in the ultraviolet range and is very useful for measuring bandwidth of narrow band excimer lasers used for integrated circuit lithography. Light from the laser is focused into a diffuser and the diffused light exiting the diffuser illuminates an etalon. A portion of its light exiting the etalon is collected and directed into a slit positioned at a fringe pattern of the etalon. Light passing through the slit is collimated and the collimated light illuminates a grating positioned in an approximately Littrow configuration which disburses the light according to wavelength. A portion of the dispursed light representing the wavelength corresponding to the selected etalon fringe is passed through a second slit and monitored by a light detector. When the etalon and the grating are tuned to the same precise wavelength a slit function is defined which is extremely narrow such as about 0.034 pm (FWHM) and about 0.091 pm (95 percent integral). The etalon and the grating are placed in a leak-tight containment filled with a gas, such as nitrogen or helium. The wavelength scanning of the spectrometer is done by changing the gas pressure in the containment during the scan.

BRIEF DESCRIPTION OF THE DRAWINGS

FIG. 2 shows a layout of elements of a first preferred embodiment of the present invention.

FIGS. 3A and 3B show performance data of the preferred embodiment in graphical form.

DETAILED DESCRIPTION OF PREFERRED EMBODIMENTS

Figure 1A:
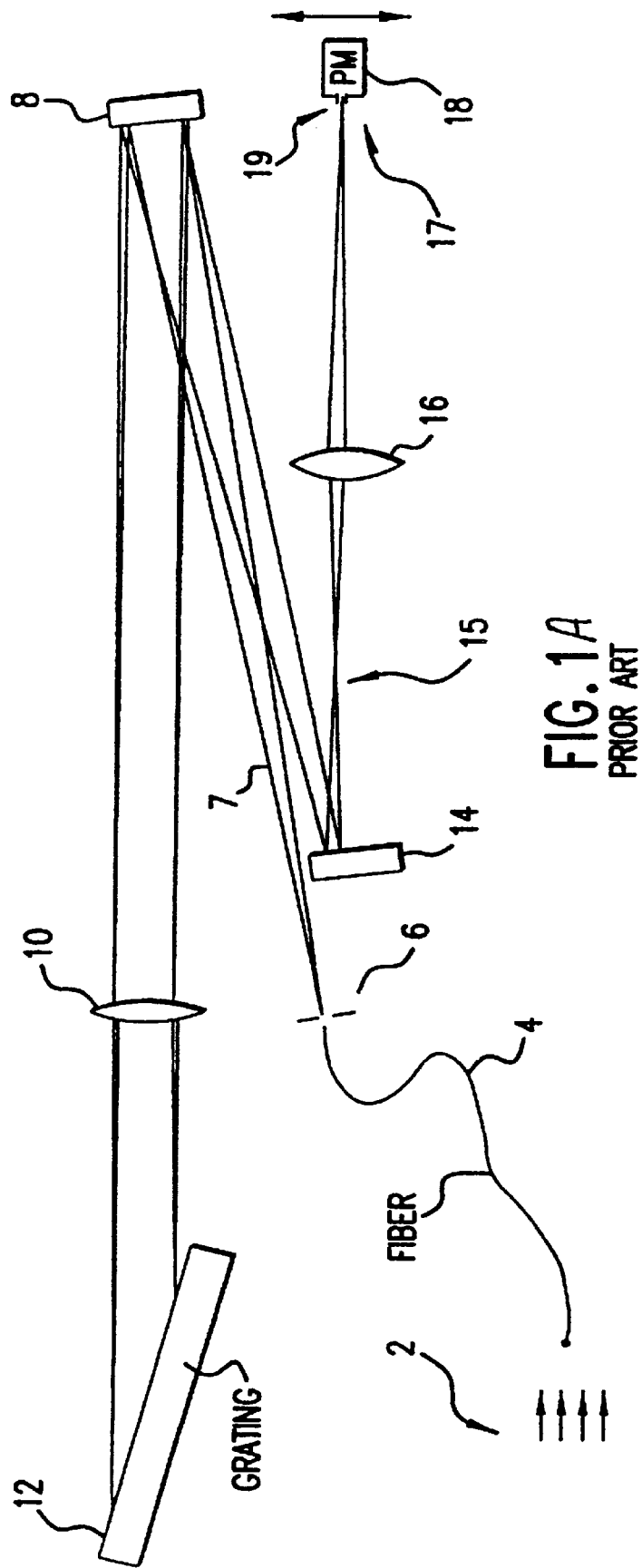
FIG. 1A shows a prior art grating spectrometer.
Figure 1B:
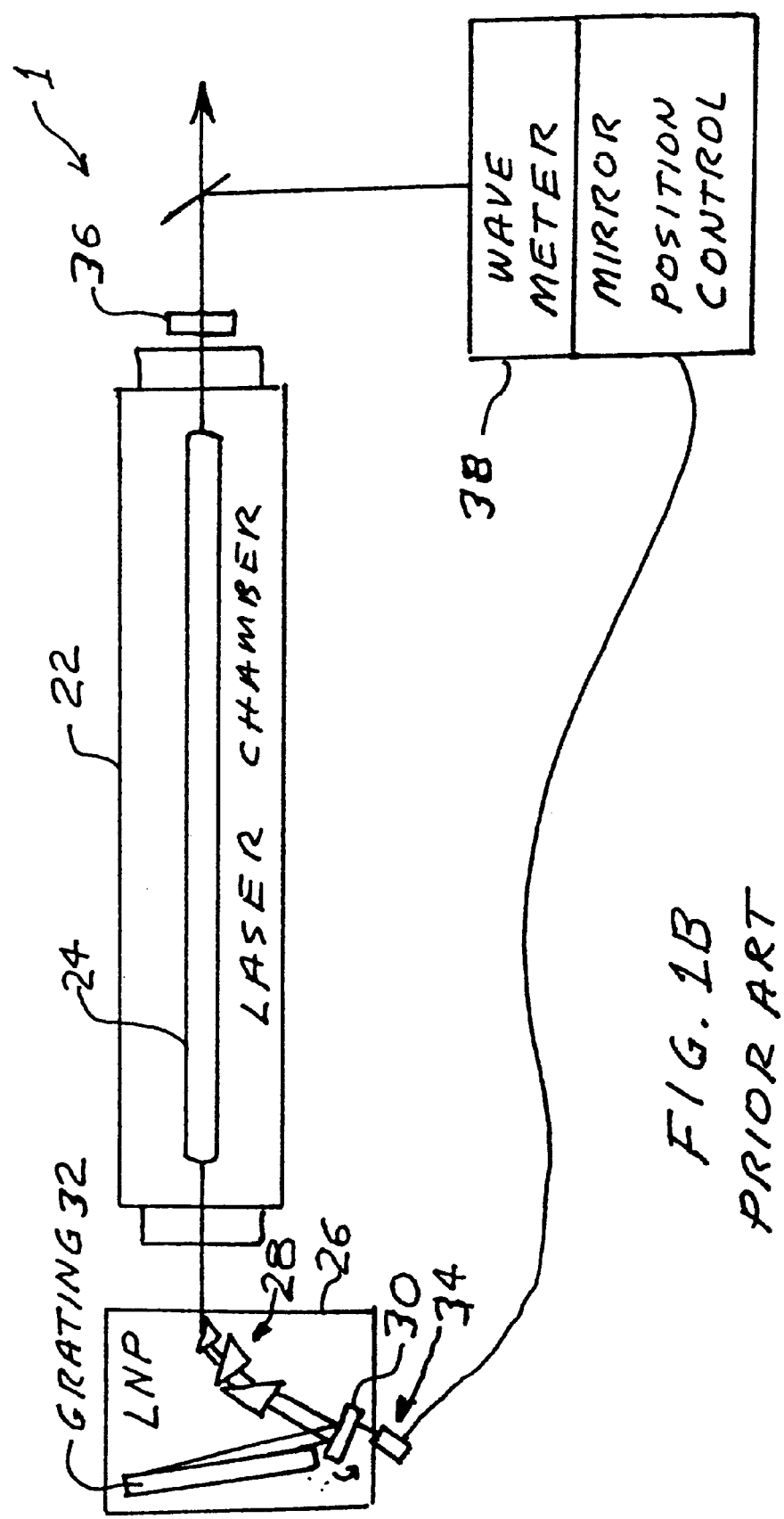
FIG. 1B shows features of a prior art excimer laser system.

A preferred embodiment of the present invention is described by reference to FIG. 2A laser beam such as a portion of the beam directed into wavemeter 38 shown in FIG. 1B, is focused by lens L1 into a diffuser, D.

One side of this diffuser is ground or chemically etched to create a holographic diffuser. The other side is polished. Diffuser material can be fused silica. All the components of the spectrometer with the exception of the laser focusing lens L1 is placed in air-tight enclosure 50. Diffuser D serves as a air-tight sealed window for the enclosure 50. Sealing is done on the polished side of the diffuser using one of many known techniques.

The diffuser scatters the light before it enters into etalon ET. This etalon determines the FWHM resolution of the instrument and it should have the highest practical finesse. In a prototype system, Applicants used an etalon with a finesse of about 30 and FSR of 1.5 pm. The light, after passing through the etalon, is collected onto slit, S1, by lens L2, which has a focal length of 90 cm. A 5×200 μm slit was used. The etalon is aligned so that the slit S1, is in the exact center of the fringe pattern created by the etalon. This slit is the entrance slit of the grating part of the spectrometer. The light is collimated by the lens L3, and illuminates a 250 mm echelle grating, GR1, which is arranged in an approximate Littrow configuration. A small deviation from Littrow enables pick-up mirror M1 to separate a portion of the diffracted beam and direct it into the exit slit S2, where the signal is measured with a photo-multiplier tube, PMT. A partially transmitting mirror M2, provides for a double pass on the grating in order to increase the dispersion. A portion of the light, reflected from GR1 for the first time, is then reflected by M2 back to the grating for the second pass. The second reflection from GR1, which passes through M2 is picked up by the mirror M1. This scheme allows the doubling of the grating dispersion with relative ease but at the cost of reduced efficiency. Efficiency, however, is usually not a problem.

With this scheme, the etalon and grating have to be tuned relative to each other such that the wavelength at which the etalon has maximum transmission at the slit S1 is also the same wavelength at which grating reflects maximum through slit S2. This tuning can be accomplished by either rotating grating GR1 or moving slit S2.

Once grating and etalon are tuned relative to each other, they both have to be scanned over a range of wavelength so that a laser bandwidth can be measured. This is done by changing a gas pressure in enclosure 50. Both grating and etalon will have the wavelength of their maximum transmission (reflection) changed with pressure according to:

$$\lambda = \lambda_o + \alpha \cdot (P - P_o),$$

where $\lambda_o$ is the wavelength of maximum transmission at pressure $P_o$ and $\alpha$ is a coefficient depending on gas and wavelength. For $N_2$ and $\lambda$ at 193.3 mn this coefficient is $\alpha \approx 0.58$ pm/kPa. Therefore, if the wavelength has to be scanned over 5 pm, it will require change in pressure of about 8.6 kPa. This pressure scan can be achieved by providing metered injects of $N_2$ into enclosure 50 with a metering valve V1 controlled by computer 60. After scan is complete, gas is released through a second valve V2 also controlled by computer 60. During the scan, computer 60 collects the data from a PMT module to measure the laser spectrum.

FIGS. 3A and 3B show the calculated slit function of this device. $\alpha\lambda_{FWHM}$ of the slit function is 0.034 pm and $\Delta\lambda_{195\%} = 0.091$ pm. This is a big improvement compared to $\Delta\lambda_{FWHM} = 0.11$ pm and $\Delta\lambda_{195\%} = 0.5$ pm for the double pass grating spectrometer alone.

Second Preferred Embodiment

Figure 4:
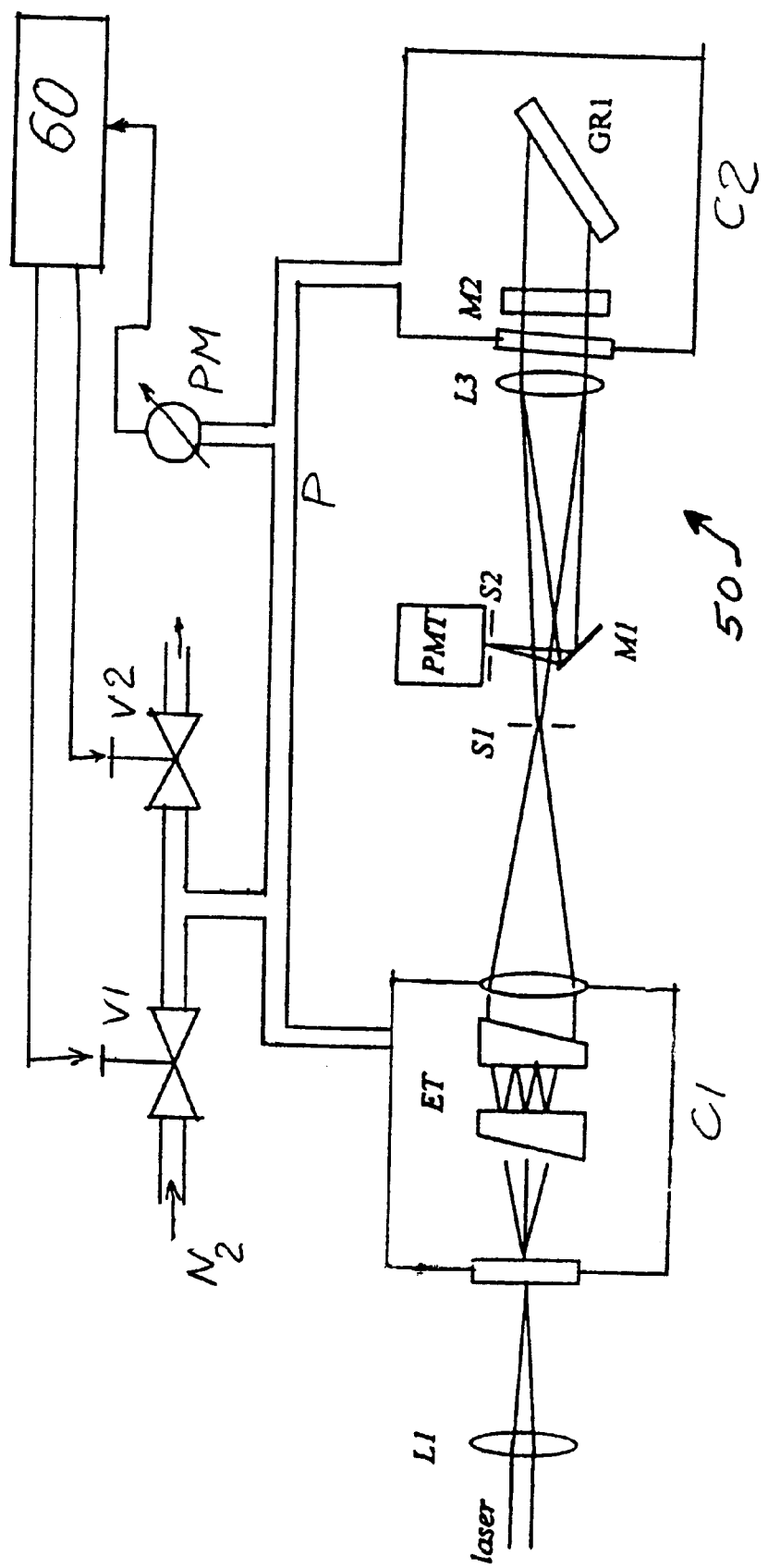
FIG. 4 shows a layout of a second preferred embodiment of the present invention.

The second preferred embodiment is shown in FIG. 4. In this embodiment, etalon and grating are enclosed in two separate containers C1 and C2 connected by a pipe P. Having two smaller vessels makes it technically easier to control pressure, rather than doing it in a large volume spectrometer enclosure of the first embodiment. Vessels C1 and C2 are connected with a pipe, which equalizes the pressure in them.

The reader should understand that the preferred embodiment described above is by example only and is not intended to limit the scope of the present invention. For example, mirror M2 may not be included so that the light only has the a single dispersion on the grating. The spectrometer may be used as a test instrument for accurately measuring band width of a laser periodically with the resulting measurement used to calibrate operational bandwidth instruments on the laser. Alternatively, the present invention could be incorporated into the design of production lasers so that very precise measurement of bandwidth could be made as often as desired.

There are many other techniques available for regulating the pressure in the pressure containments other than the technique specifically described. For example, a piston or a pump can be used to compress the gas. Also a separate chamber (connected by a pipe to the containment for the optics) could be provided in which a portion of the gas is heated to increase the pressure in the optics containing portion of the containment. Gas other than nitrogen can be used, for example, helium.

The reader should understand and recognize that many changes and alterations could be made without deviating from the spirit of the invention. Therefore, the scope of the invention should be determined by the appended claims and their legal equivalents.

We claim:

1. A high resolution spectrometer having a very narrow slit function and a relatively large spectral range, said spectrometer comprising:
   A) a pressure containment,
   B) an etalon optical unit contained in said pressure containment and configured to monitor a beam of narrow band ultraviolet light and to produce interference fringes, said etalon optical unit comprising:
      1) a diffuser positioned to diffuse said light into a very large number of directions to produce a diffuse beam;
      2) an etalon positioned in the path of said diffuse beam;
      3) a first slit aperature; and
      4) a lens unit positioned to collect light passing through said etalon and to focus a portion of the passing light through said first slit aperture,
   C) a grating contained in said pressure containment unit comprising:
      1) a collimating optical unit positioned to collect light passing through said first slit aperture,
      2) a grating positioned in an approximately Littrow configuration to reflect said collimated light back through said collimating optical unit so that spectral components of reflected light are focused by said collimating optical unit at positions dependent on wavelength of said spectral components,
      3) a second slit aperture,
      4) a mirror positioned to reflect through said second slit aperture a portion of said light passing back through said collimating optic,
      5) a light monitor positioned to monitor light passing through said second slit aperture, and
   D) a gas contained in said pressure containment and a regulation means for controlling gas pressure in said pressure containment;
   wherein said first and said second slit apertures are both positioned to pass a very narrow band of light having approximately the same narrow wavelength range and wherein wavelength scanning is accomplished by changing the pressure in said pressure containment.

2. A spectrometer as in claim 1 wherein said grating monochromator unit further comprises a partially reflecting mirror positioned between said collimating lens and said grating to cause a portion of said light passing through said first slit aperture to be reflected at least twice from said grating.

3. A spectrometer as in claim 2 wherein said mirror is positioned to reflect through said second slit aperture light twice reflected from said grating.

4. A spectrometer as in claim 1 wherein said containment comprises a single vessel containing said etalon optical unit and said grating unit.

5. A spectrometer as in claim 1 wherein said containment comprises at least two vessels connected by a pipe one of said two vessels containing said etalon optical unit and the other of said vessel containing said grating unit.

6. A narrow band ultraviolet laser system comprising:
   A) a narrow band excimer laser having a wavelength control mechanism capable of scanning output wavelength over a range of at least several picometers,
   B) a pressure containment,
   C) an etalon optical unit contained in said pressure containment configured to monitor a beam of narrow band ultraviolet light and to produce interference fringes, said etalon optical unit comprising:
      1) a diffuser positioned to diffuse said light into a very large number of directions to produce a diffuse beam;
      2) an etalon positioned in the path of said diffuse beam;
      3) a first slit aperature; and
      4) a lens unit positioned to collect light passing through said etalon and to focus a portion of the passing light through said first slit aperture,
   D) a grating unit comprising:
      1) a collimating optical unit positioned to collect light passing through said first slit aperture,
      2) a grating positioned in an approximately Littrow configuration to reflect said collimated light back through said collimating optical unit so that spectral components of reflected light are focused by said collimating optical unit at positions dependent on wavelength of said spectral components,
      3) a second slit aperture,
      4) a mirror positioned to reflect through said second slit aperture a portion of said light passing back through said collimating optic,
      6) a light monitor positioned to monitor light passing through said second slit aperture, and
   E) a gas contained in said pressure containment and a regulation means for controlling gas pressure in said pressure containment, and
   wherein said first and said second slit apertures are both positioned to pass a very narrow band of light having approximately the same narrow wavelength range so as to permit bandwidth measurements and wherein wavelength scanning is accomplished by changing the pressure in said pressure containment.

7. A laser as in claim 4 wherein said grating monochromator unit further comprises a partially reflecting mirror positioned between said collimating lens and said grating to cause a portion of said light passing through said first slit aperture to be reflected at least twice from said grating.

8. A laser as in claim 5 wherein said mirror is positioned to reflect through said second slit aperture light twice reflected from said grating.

* * * * *